United States Patent [19]

Huggard

[11] Patent Number: 4,462,947
[45] Date of Patent: Jul. 31, 1984

[54] HEAT-RESISTANT FOAMED POLYESTERS

[75] Inventor: Mark T. Huggard, Cranbury, N.J.

[73] Assignee: Mobil Oil Corporation, New York, N.Y.

[21] Appl. No.: 454,202

[22] Filed: Dec. 28, 1982

[51] Int. Cl.³ .......................... B29H 7/20; C08J 9/02
[52] U.S. Cl. .................................... 264/54; 264/237; 264/321; 264/DIG. 5; 521/79; 521/81; 521/138; 521/182
[58] Field of Search ................... 521/182, 138, 81; 264/54, 237, 321, DIG. 5

[56] References Cited

U.S. PATENT DOCUMENTS

| 3,470,114 | 9/1969 | Siggel et al. | 521/138 |
| 4,127,631 | 11/1978 | Dempsey et al. | 264/554 |
| 4,224,264 | 9/1980 | Ort | 521/182 |

Primary Examiner—Morton Foelak
Attorney, Agent, or Firm—Alexander J. McKillop; Michael G. Gilman; Stanislaus Aksman

[57] ABSTRACT

There are provided heat-resistant, foamed, crystalline polyesters, such as polyethylene terephthalate foamed with a polycarbonate and subjected to crystallization annealing, which are particularly useful for forming light weight, ovenable food containers.

4 Claims, No Drawings

HEAT-RESISTANT FOAMED POLYESTERS

BACKGROUND OF THE INVENTION

This invention relates to heat-resistant, foamed, crystalline polyesters which are particularly useful for forming light weight, ovenable food containers.

The Siggel et al U.S. Pat. No. 3,470,114 the entire disclosure of which is expressly incorporated herein by reference, describes the formation of amorphous, foamed polyesters which may be shaped by various techniques such as injection molding. However, objects formed from this material tend to deform at elevated temperatures due to the amorphous nature of the polyester.

The Dempsey et al U.S. Pat. No. 4,127,631, the entire disclosure of which is also expressly incorporated herein by reference, describes a non-foamed, thermoformed polyester sheet material. However, as compared with foamed polyester, this non-foamed material has a relatively high density.

SUMMARY OF THE INVENTION

According to one aspect of the invention, there is provided a foamed, crystalline, high molecular weight linear polyester, which is a polycondensation product of an aromatic dicarboxylic acid and a glycol.

According to another aspect of the invention, there is provided a process for preparing a thermoformed, foamed, crystalline, high molecular weight linear polyester sheet, said process comprising the steps of:

(i) reacting a homogeneous mixture consisting essentially of:
(a) a high molecular weight linear polyester, which is a polycondensation product of an aromatic dicarboxylic acid and a glycol; and
(b) a high molecular weight linear aromatic polycarbonate represented by the repeating structural unit of the formula:

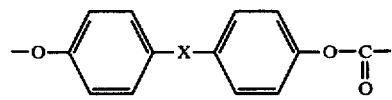

wherein X is a divalent hydrocarbon radical with a total of from 2 up to about 9 carbon atoms selected from the group consisting of

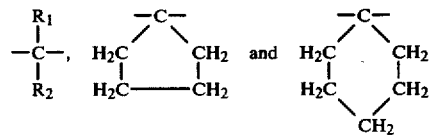

in which $R_1$ represents a member selected from the group consisting of hydrogen and lower alkyl and $R_2$ represents a member selected from the group consisting of phenyl and alkyl of 1 to 7 carbon atoms, in a weight ratio of (a):(b) of about 20:1 to 1:20, at a temperature and for a period of time sufficient to form the mixture into a softened foamable mass and to release carbon dioxide from said polycarbonate for foaming said mass;

(ii) extruding said foamable mass of step (i) into a sheet at a pressure sufficient to cause the released carbon dioxide to expand and reduce the density of the extruded sheet, the average crystallinity of said sheet being in the range from about 0% to about 18%;

(iii) contacting said sheet with a mold which is at a temperature in the range of from about 240°–350° F.;

(iv) applying forces comprising a differential in applied pressure to said sheet so as to make said sheet conform to said mold, whereby a thermoformed sheet is made;

(v) allowing said thermoformed sheet to remain in contact with said mold until an average crystallinity of at least about 20% is achieved; and (vi) removing said thermoformed sheet from said mold.

According to another aspect of the invention, there is provided a process for preparing an injection molded, foamed, crystalline, high molecular weight linear polyester structure, said process comprising the steps of:

(i) reacting a homogeneous mixture consisting essentially of:
(a) a high molecular weight linear polyester, which is a polycondensation product of an aromatic dicarboxylic acid and a glycol; and
(b) a high molecular weight linear aromatic polycarbonate represented by the repeating structural unit of the formula:

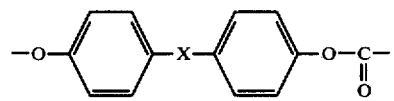

wherein X is a divalent hydrocarbon radical with a total of from 2 up to about 9 carbon atoms selected from the group consisting of

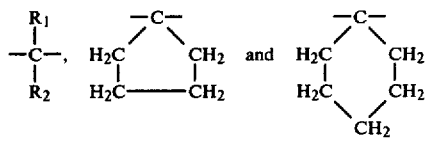

in which $R_1$ represents a member selected from the group consisting of hydrogen and lower alkyl and $R_2$ represents a member selected from the group consisting of phenyl and alkyl of 1 to 7 carbon atoms, in a weight ratio of (a):(b) of about 20:1 to 1:20, at a temperature and for a period of time sufficient to form the mixture into a softened foamable mass and to release carbon dioxide from said polycarbonate for foaming said mass;

(ii) injecting said foamable mass of step (i) into a heated mold at a pressure sufficient to cause the released carbon dioxide to expand and reduce the density of the injected mass;

(iii) maintaining the injected mass in the heated mold of step (ii) for a time sufficient to crystallize the foamed polyester to a degree sufficient to impart to the molded structure a resistance to thermally induced deformation up to temperatures of at least 400° F.; and (iv) removing the injection molded structure from said mold.

According to another aspect of the invention, there is provided an ovenable food container composed of a foamed, crystalline, high molecular weight linear polyester, which is a polycondensation product of an aromatic dicarboxylic acid and a glycol, wherein the degree of crystallinity is sufficient to impart to said foamed polyester a resistance to thermally induced deformation up to temperatures of at least 400° F., and wherein the degree of foaming is sufficient to achieve a density reduction of at least 5% as compared with said polyester in the absence of foaming.

DETAILED DESCRIPTION

By foaming polyester in accordance with the present invention, a significant density reduction of the polyester can be achieved. This density reduction may be a least 5% or even at least 30% with respect to the polyester in the non-foamed state. This density reduction permits the formation of light weight objects and reduces the quantity of polyester necessary to form such objects which may result in considerable cost savings.

The degree of crystallinity of the foamed polyester according to the present invention may be sufficient to permit the polyester, and particularly objects formed therefrom, from resisting thermally induced deformation up to temperatures of at least 400° F. (i.e. about 205° C.) or even at least 500° F. (i.e. about 260° C.). Food containers formed from this crystalline, foamed polyester may, therefore, be ovenable, i.e. capable of being placed in an oven (e.g., gas, electric or microwave) for a time and temperature sufficient to cook food contained therein. In addition to being ovenable, these food containers may be capable of holding food in freezers. Thus, food containers according to the present invention are capable of remaining dimensionally stable over a wide range of temperatures.

The foamed, crystalline polyesters of the present invention may be formed into a variety of shapes and structures by a variety of techniques. For example, techniques employed in the aforementioned Siggel et al U.S. Pat. No. 3,470,114 and the Dempsey et al U.S. Pat. No. 4,127,631 may be employed.

It is possible to produce a foam polyester simply by reacting a homogeneous mixture of (A) a high molecular weight linear polyester which is a polycondensation product of an aromatic dicarboxylic acid and a glycol and (B) a high molecular weight linear aromatic polycarbonate, in a weight ratio of said polyester (A) to said polycarbonate (B) of about 20:1 to 1:20 (e.g., 20:1 to 1:1), at an elevated temperature and for a period of time sufficient to form the mixture into a softened foamable mass and to release or liberate carbon dioxide from said polycarbonate for foaming said mass. The foamable composition itself can be readily produced by simply homogeneously admixing the two compositions (A) and (B) at a temperature above the softening point of at least one of these components, but at a sufficiently low temperature and/or a sufficiently short period of time and/or under rapid cooling of the homogenized mixture to prevent any substantial splitting-off of carbon dioxide by decomposition of the polycarbonate.

The term "softening point" is employed herein in preference to the designation of a "melting point" since linear polyesters generally do not exhibit a sharp melting point but rather a transition range of temperature at which the polyester softens and finally flows into a melt. Of course, it will be understood that there must be a sufficient degree of flow at or above the softening point to permit deformation and bubble or cell formation within the polyester mass during actual foaming. The term "high molecular weight" is used herein in the manner generally accepted for the description of synthetic polymers and especially linear polyesters which are to have a substantially solid or rigid structure at normal or room temperatures rather than a liquid or viscous substance as exhibited by relatively low molecular weight polymers. Thus, for most practical uses, linear polyesters should have a molecular weight of at least 10,000 and preferably more than about 20,000.

As the polyester component (A), it is particularly desirable to use polyethylene terephthalate because it is a readily available bulk product having widespread use as a synthetic fiber in the textile industry. However, there are many known modifications of this linear fiber-forming polyester beginning with the Whinfield et al patent, U.S. Pat. No. 2,465,319, and extending up to date in which the terephthalic acid can be replaced in part by other aromatic polycarboxylic acids or even a cycloaliphatic dicarboxylic acid such as 1,4-dihydroxy-cyclohexane and in which the glycols are generally designated by the formula

$HO(CH_2)_nOH$ where n is an integer of from 2 to 10. Accordingly, such modified linear polyesters are not to be excluded from the scope of the present invention, even though it is much preferred to use polyethylene terephthalate or those modifications thereof containing not more than 15% and preferably less than 5% by weight of other acid or glycol modifiers.

The aromatic polycarbonates employed as component (B) are a well-recognized class of polymers, referred to as "aromatic polyesters of carbonic acid" by H. Schnell in his article in *Angewandte Chemie*, vol. 68, No. 20, pp. 633–660, Oct. 21, 1956, and subsequently designated more simply by the term "aromatic polycarbonates" in the book by the same author entitled "Chemistry and Physics of Polycarbonates," Interscience Publishers, New York (1964). This book is incorporated herein by reference in order to avoid undue repetition as to the manner in which the aromatic polycarbonates are prepared, their physical and chemical properties and other detailed information concerning these polymers and their precursors. Since these aromatic polycarbonates are also linear polyesters and are being developed to some extent as stretched and crystallized fibers as well as films, it will be recognized that the compositions according to the present invention are essentially linear fiber-forming synthetic polyesters of organic dicarboxylic acids and organic dihydroxy compounds, even though each component is quite different in its chemical structure and its normal or most practical utility.

For purposes of the present invention, it is especially desirable to employ the aromatic polycarbonates which can be designated as the linear condensation products of carbonic acid with a 4,4'-dihydroxy-diphenyl-alkane, a 4,4'-dihydroxy-triphenyl-alkane or a 4,4'-dihydroxy-diphenyl-cycloalkane in which the bridging group between the hydroxy-substituted phenyl nuclei contains at least 2 up to about 9 carbon atoms which is free of aliphatic unsaturation. More particularly, the preferred aromatic polycarbonates are those linear polymers defined by the repeating or recurring structural unit of the formula

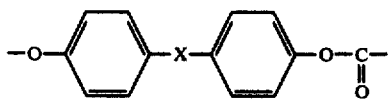

wherein X is a divalent hydrocarbon radical with a total of 2 up to about 9 carbon atoms selected from the group consisting of

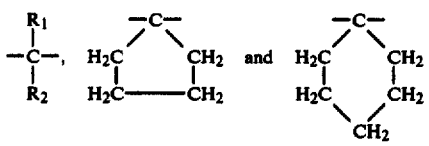

in which $R_1$ represents a member selected from the group consisting of hydrogen and lower alkyl, such as methyl, ethyl or propyl, and $R_2$ represents a member selected from the group consisting of phenyl and alkyl of 1 to 7 carbon atoms. These aromatic polycarbonates can be obtained with molecular weights from about 18,000 up to 500,000 or more, but for purposes of the present invention, it is desirable to use those polycarbonates with a range of the average molecular weight falling between about 20,000 and 250,000 and preferably between about 25,000 and 150,000.

For reasons of economy and availability, it is particularly useful to practice the present invention with the aromatic polycarbonate obtained from 4,4'-dihydroxy-diphenyl-2,2-propane, more commonly referred to as "bisphenol A" and illustrated by the following formula:

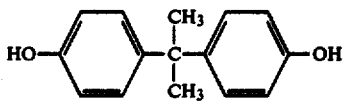

However, good results have also been achieved with the polycarbonate derived from 4,4'-dihydroxy-diphenyl-methyl-phenyl-methane having the formula:

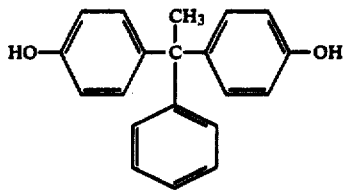

Other suitable aromatic polycarbonates for the purposes of this invention include those derived as the carbonic acid esters of the following dihydroxy aromatic compounds:
4,4'-dihydroxy-diphenyl-1,1-ethane,
4,4'-dihydroxy-diphenyl-1,1-butane,
4,4'-dihydroxy-diphenyl-1,1-isobutane,
4,4'-dihydroxy-diphenyl-1,1-cyclopentane,
4,4'-dihydroxy-diphenyl-1,1-cyclohexane,
4,4'-dihydroxy-diphenyl-phenyl-methane,
4,4'-dihydroxy-diphenyl-2,2-butane,
4,4'-dihydroxy-diphenyl-2,2-pentane,
4,4'-dihydroxy-diphenyl-2,2-hexane,
4,4'-dihydroxy-diphenyl-2,2-isohexane,
4,4'-dihydroxy-diphenyl-2,2-heptane,
4,4'-dihydroxy-diphenyl-2,2-octane,
4,4'-dihydroxy-diphenyl-2,2-nonane,
4,4'-dihydroxy-diphenyl-ethyl-phenyl-methane,
4,4'-dihydroxy-diphenyl-3,3-pentane, and
4,4'-dihydroxy-diphenyl-4,4-heptane.

The polycarbonates of these compounds, i.e., the carbonic acid polyesters prepared therefrom, can be named by attaching the prefix "poly-" and the suffix "-carbonate" to the name of the particular aromatic compound.

Although the description and working examples in this specification are directed primarily to the use of the polycarbonate of 4,4'-dihydroxy-diphenyl-2,2-propane (bisphenol A) in combination with polyethylene terephthalate as the polyester component, there is no intention to limit the invention to these two specific materials which happen to be most practical from a commercial viewpoint. All of the aromatic polycarbonates are closely related in terms of molecular structure and chemical properties with only a few exceptions, even when the phenyl nuclei are further substituted by lower alkyl, halogen, methoxy and the like or when copolymers are formed from different aromatic dihydroxy compounds. In general, it is desirable to employ those polycarbonates having a softening range below about 260° C. and preferably below 250° C.

The aromatic polycarbonates and especially those listed hereinabove such as 4,4'-dihydroxy-diphenyl-2,2-propane are capable of decomposing and releasing carbon dioxide in the presence of the polyester component (A) when heated to temperatures of approximately 250° C. up to 350° C. even though these same polycarbonates alone are quite stable at these temperatures and are often processed on extrusion, casting or molding equipment without any decomposition. Thus, the aromatic polycarbonates when admixed uniformly with other linear polyesters of the polyethylene terephthalate type are capable of acting as an autogeneous foaming agent, even though the homopolymers of these carbonates require the addition of a distinct foaming agent or at least a recognizably unstable gas-liberating compound before any foaming takes place.

The chemical reaction which takes place between the polyester (A) and the polycarbonate (B) in order to release carbon dioxide as the cell-forming gas is believed to be an ester interchange which takes place more rapidly or completely with increasing temperatures and increased residence or retention time in a heating zone. Not only is carbon dioxide liberated in this reaction, but also it appears that the decomposed polycarbonate chains become installed in the macromolecule, i.e. in the linear chain, of the polyester component (A). The possibility of producing such foam polyesters is therefore based upon the concept that aromatic polycarbonates, which otherwise can be normally processed in a temperature range of between 240° C. and 350° C. without decomposition so as to form various shaped or molded articles, undergo a decomposition reaction in admixture with linear polyesters such as those obtained from glycol terephthalates with evolution of carbon dioxide and simultaneous addition of the polycarbonate residue into the linear polyester chain.

The process of foaming the homogeneous mixture of polyester (A) and the polycarbonate (B), as will be apparent, can be carried out in the usual manner for thermoplastic materials containing a foaming agent which is activated at a temperature above the softening point of the material to be expanded. In general, the reaction for releasing carbon dioxide from the polycarbonate and simultaneous foaming can be carried out at temperatures above about 250° C. and preferably from about 270° C. to 350° C. in an at least partially enclosed mold, extruder or similar reaction zone. The retention time in the reaction zone can be relatively short, e.g., from about one minute up to about 15 minutes, preferably from about 1.3 to 1.5 minutes at the higher temperature and about 10 to 12 minutes at the lowest temperature. Temperatures above 350° C. should ordinarily be avoided to prevent unnecessary damage to the linear polyester.

It is a particular advantage that it is possible, especially with the preferred polyester and polycarbonate components, to produce the initial homogeneous mixture under elevated temperatures below about 270° C. and preferably less than 260° C. without causing any perceptible foaming to take place, particularly if this mixing step is carried out rapidly as in a screw extruder or similar mixing or kneading equipment, preferably with rapid cooling of the extruded mixture, e.g. in a cold water bath. For example, when homogenizing in an extruder under these milder conditions, a polycarbonate uniformly dispersed in the polyester can be extruded as rods or sheets, the cooled mixture chopped or granulated and then stored for any period of time without any danger of losing its ability to foam.

As already noted above, the weight ratio of the polyester (A) to the polycarbonate (B) can be varied within a wide range of approximately 20:1 to 1:20, since both components are soluble in one another in any mixing ratio. This offers a further advantage in that the preliminary homogenization step prior to actual foaming, as discussed above, can be accomplished at the lowest possible temperature corresponding to the lower softening range of one of the two components, since one of these components upon melting becomes a solvent for the other component. This in turn permits a much wider choice of suitable polyesters and polycarbonates in terms of monomeric components and molecular weights and a corresponding variation of the final foam polyester product in terms of its physical properties as well as the pore size of its cells.

From an economical viewpoint, a weight ratio of (A):(B) in the upper end of the range of about 20:1 may be preferred. Nevertheless, one advantage of reducing the weight ratio to the lower end of the range is that the operating temperature may usually be lowered because of a lowering of the softening range of the homogeneous mixture and/or a lowering of the temperature at which substantial amounts of carbon dioxide are released. Likewise, the density of the foamed product will tend to vary inversely with the proportion of the aromatic polycarbonate, although this density can also be controlled by the extent to which the released gas is permitted to expand under a pressure differential.

One of the preferred methods of carrying out a process of the invention consists in the use of a screw injection molding machine, since an ideal homogenization or plasticizing of the polyester-polycarbonate mixture can be achieved in the screw or worm and the production of the foam polyester as a molded article can be carried out in a single continuous operation. The same advantages are achieved by processing the mixture in an extruder with an attached injection mold. On the other hand, it is also possible to produce the foam polyester in a piston injection molding machine, provided that the polyester-polycarbonate mixture is first homogenized in an extruder or a similar mixing device such that a prehomogenized foamable composition is obtained for subsequent use in the piston injection molding machine. Thus, the present invention provides a means of processing the linear fiber-forming polyesters such as polyethylene terephthalate into molded articles with injection molding machines.

The process of the invention can also be carried out by simply using an extruder without an attached injection mold. In this case, the polyester-polycarbonate mixture is homogenized and reacted for release of carbon dioxide under superatmospheric pressure in the screw or worm extruder and is then extruded or drawn off therefrom at atmospheric pressure so that the softened extruded mass rapidly foams and resolidifies into the desired extruded shape. Thus, foam polyester can be produced as rods, bands or sheets with regular or irregular profiles, depending upon the die opening of the extruder.

Conventional components of extrusion and injection molding apparatus can be used in these processes, and these are heated in the usual manner so as to maintain the desired homogenizing and foaming temperature of up to about 350° C., preferably above about 270° C., for the foaming reaction.

In order to achieve a uniform pore size and distribution when using the injection molding process for the production of foam polyesters according to the invention, the injection mold connected to the outlet side of the processing machine is placed under a vacuum. If the foamable thermoplastic melt is injected into a non-evacuated mold and solidified, the greater part of the carbon dioxide remains dissolved in the polyester and can be liberated or expanded therein only by subsequent tempering, e.g. at about the softening point of the polyester product. A foam product is then obtained, but the non-homogeneous pore or cell structure is much less desirable.

Therefore, it is especially desirable to evacuate the injection mold to a pressure of about 5 to 300 mm. Hg, preferably about 50 to 100 mm. Hg, and this evacuation can occur before or during the injection but preferably after the mold has been injected with the hot foamable mass so as to achieve especially uniform pores or cells. In order to obtain injection molded foamed products of different densities, it is most convenient to vary the weight of material charged into a mold of constant volume. Thus, as the weight of the charge or the "shot capacity" increases with a constant size of mold, the density of the foamed product will likewise increase with a corresponding decrease in pore size regardless of the pressure difference before and after application of a vacuum. With a sufficiently high density, it is possible to achieve a molded foamed product of the type classified as a rigid, brittle and open-celled foam structure with a closed outer skin or surface.

A sufficient degree of crystallinity may be imparted to the polyester by sufficient annealing or tempering concurrent with or subsequent to the foaming process. Preferred processes are either annealing a preformed, foamed polyester sheet material in a thermoforming process as described in the Dempsey et al U.S. Pat. No. 4,127,631 or injecting a foamable polyester into a heated mold at a foam-forming pressure and maintaining the injected foam in the heated mold for a sufficient annealing time. It is also possible to inject foamable polyester into a non-heated injection mold according to a process described in the Siggel et al U.S. Pat. No. 3,470,114, and to then subject this amorphous molded object to crystallization annealing. However, this process is not preferred, because the amorphous injection molded object may change shape during the annealing process.

When foamable polyester is injected into a heated mold, the temperature of the heated mold may be, e.g., from about 200° F. (i.e. about 93° C.) to about 450° F. (i.e. about 232° C.).

When foamable polyester is extruded into a sheet material, foaming generally takes place the instant the softened polyester is subjected to sufficient foaming pressure (e.g., upon being exposed to atmospheric pressure upon leaving the extrusion die). The foamed sheet may then be immediately cooled on a chill roll, e.g., at a temperature of from about 70° F. (i.e. about 21° C.) to about 120° F. (i.e. about 49° C.), in order to inhibit crystallization. A sheet of predominantly amorphous foamed polyalkylene terephthalate (PAT) can then be thermoformed by means of a differential in applied pressure of less than about 5 atmospheres in a mold at a temperature in the range of 240°-350° F. into a finished article having a crystallinity of at least 20%, which finished article will not with subsequent use become very brittle, and which can be used without melting or distorting when subjected to heating to a temperature of about 400° F. for an hour or more.

Time dependent processes occurring during a conventional thermoforming step which lead to a loss of dimensional integrity of a sheet of foamed PAT can be balanced by other time dependent processes leading to a stabilization of dimensional integrity so that a predominantly amorphous sheet of foamed PAT can be thermoformed directly into a thermoformed article of crystalline foamed PAT on process equipment conventionally used with thermoplastic materials such as polystyrene, polyethylene, amorphous PAT, and the like.

The time dependent processes leading to a loss of dimensional integrity in a thermoforming step involve time dependent forces used to conform a foamed PAT sheet to a mold surface and the rate of heat transfer from said heated mold surface to said PAT sheet.

Time dependent processes leading to a stabilization of dimensional integrity of said PAT sheet in a thermoforming process step is the process of crystallization which is dependent upon an initial rate of crystallization of said PAT sheet increased by the heat transferred from a heated mold. It has been found that this initial rate and subsequent rate change in crystallization of a sheet is controlled by five factors: (1) the half-time for crystallization at some temperature of the sheet, (2) the film thickness of the sheet, (3) the thermally induced average crystallinity of the sheet just prior to contact with a heated mold, (4) the average initial temperture of the sheet just prior to contact with said mold, and (5) the temperature of said mold. It is to be noted that average crystallinity and the half-time for crystallization of the sheet are coupled variables.

PAT sheets having a half-time for crystallization at 410° F. much below 0.5 minute are very difficult to handle. This is because the lower the half-time for crystallization, the generally lower must be the average crystallinity of the sheet just prior to contact with the heated mold. To thermoform a material with a half-time for crystallization much below 0.5 minute having both a low thermally induced average crystallinity and an average temperature in the range of about 210°-300° F. is generally very difficult, because the rate of heating of a totally amorphous PAT sheet must be very rapid to permit one to form such a sheet at all, and even if formed, the length of time such a sheet can exist as a usefully thermoformable sheet can be very short, i.e., on the order of less than about a tenth of a second.

Sheets having a half-time for crystallization at 410° F. of much more than 5 minutes become commercially impractical for the disclosed thermoforming process. This is because the length of time necessary is on the order of minutes for such sheets (i) to reach a thermally induced average crystallinity in the range of about 0% to 18% at a temperature in the range of about 210°-300° F. and subsequently, (ii) to be shaped in contact with a mold at 240°-350° F. and allowed to remain in such contact until a 20% average crystallinity is achieved. A commercially attractive thermoforming process requires (i) and (ii) both to be achieved on the order of about 30 seconds.

In general, the lower is the half-time for crystallization at 410° F. of a PAT sheet, the faster is the initial rate of crystallization at all temperatures for an amorphous sheet or web of said PAT. Rapidly heating, as for example by means of an infrared heating source, generally produces a thermal gradient. The thicker a particular sheet or web is, the greater generally are the maximum differences in temperature therein.

The thickness of a particular PAT sheet is primarily limited by the particular method of heating insofar as such heating produces significant variations in temperature throughout a sheet. It is to be noted that such variations in temperature induce variations in crystallinity throughout the sheet. Thus if a PAT sheet is too thick for a particular method of heating, then before the interior areas of said sheet have reached that thermoforming temperature in the range of about 210°-300° F., the crystallization at or near the surface has proceeded to such an extent that the sheet is no longer thermoformable at low pressure.

The thermoforming temperature range is primarily determined at the lower end, by the fact that at lower and lower temperatures a PAT sheet becomes more and more stiff and eventually loses that minimal amount of flexibility necessary for proper thermoforming; and at the upper end, by the fact that at higher and higher temperatures said PAT sheet becomes more and more flexible and eventually loses that minimal amount of dimensional integrity necessary for proper thermoforming. The precise point when the high and low limits are reached for a particular PAT sheet or web depends in part on the average crystallinity throughout that sheet or web.

Other things being equal, as the sheet temperature increases from 270° F. to 300° F., it becomes more difficult to handle the sheet because of an increased rate of crystallization, and as sheet temperature decreases from 225° F. to 210° F. the sheet becomes more stiff and ultimately loses that minimal amount of flexibility necessary for proper low pressure thermoforming. Likewise as the mold temperature increases from 310° F. to 350° F., the sheet acts progressively more amorphous with respect to contact with the mold. As the mold temperature decreases from 270° F. to 240° F., the rate of crystallization decreases and the process becomes unduly long. Accordingly, it is preferred to contact a PAT sheet at a temperature in the range of 225° F. to 270° F. with a mold at a temperature in the range of 270° F. to 310° F.

The following discloses the specific conditions necessary to carry out a process of this invention in view of the time dependent processes going on.

Generally a process of this invention comprises thermoforming a foamed polyalkylene terephthalate sheet or web which has a half-time for crystallization at 410° F. below about 5 minutes, and preferably below about 3 minutes and of at least about a half a minute, and which has an average temperature in the range of about 210°-300° F. and preferably about 225°-270° F., and a thermally induced average crystallinity in the range of about 0% to 18% and preferably about 5% to 15%, by:

(a) contacting said sheet with a mold which is at a temperature in the range of about 240°-350° F. and preferably in the range of about 270°-310° F. wherein said mold is preferably at a higher temperature than said sheet prior to contact therebetween;
   (b) applying forces comprising a differential in applied pressure to said sheet so as to make a thermoformed sheet which conforms to said mold;
   (c) allowing said thermoformed sheet to remain in contact with said mold until an average crystallinity of at least 20% is achieved;
   (d) removing said thermoformed sheet from said mold; and
   (e) allowing said thermoformed sheet to cool.

During the shaping step of a thermoforming process the use of a heating mold which is preferably at a higher temperature than said sheet prior to contact therebetween. Further, limitations as to rate of crystallization as indicated by the half-time for crystallization at some reference temperature, and a temperature range for the heated mold are important. Two results from using a heated mold versus an unheated mold are: (1) that there is no problem during heat annealing from either shrinkage or inhibition of crystallization because of any shear induced orientation which can be introduced during the shaping of a sheet to a mold and (2) superior wall thickness uniformity is in general achieved. The greater the draw ratio which in turn generally involves greater shear stresses and more orientation that is generally induced which in turn inhibits thermally induced crystallinity and also which generally increases shrinkage.

Inherent viscosity (i.v.) of a PAT resin is used throughout the specification and claims to mean that viscosity in dl/g determined at 86° F.±0.09° F. for 0.1 g±0.003 g of said PAT resin in 25 mls of solution. The solvent of said solution is a mixture in percent by weight of 60% phenol and 40% tetrachloroethane. The numerical calculation used to interpret the data is the Billmeyer Equation. The experimental procedure followed is very similar to ASTM D 1243.

It is to be noted that a particular PAT which has either 0.40 or 0.75 i.v when measured in a 60% phenol:40% tetrachloroethane solvent at 77° F. has respectively either 1.4 or 2.0 inherent viscosity when measured in a 1% solution in meta-cresol at 77° F.

A polyalkylene terephthalate (PAT) resin is defined throughout the specification and claims to consist of film forming polyesters comprising terephthalic acid moieties and one or more aliphatic diol moieties. The term "moiety" is used to indicate that portion of either the terephthalic acid or the diol which is incorporated into the polyester resin. Examples of diols which can be used are 1,2-ethanediol, 1,4-butanediol, and 1,4-cyclohexanedimethanol. Based upon total moles of terephthalic acid moieties, there can be added up to about 10 mole percent and preferably less than 5 mole percent of one or more aromatic dicarboxylic acid moieties selected from the group of aromatic dicarboxylic acids consisting of isophthalic acid, orthophthalic acid, 1,4-naphthalenedicarboxylic acid, 1,5-naphthalenedicarboxylic acid, 2,6-naphthalenedicarboxylic acid, 4,4'-diphenyldicarboxylic acid, 4,4'-diphenylaminodicarboxylic acid, 4,4'-diphenylmethyldicarboxylic acid, 4,4'-oxydiphenyldicarboxylic acid, and 4,4'-[1,2-diphenylethane]dicarboxylic acid.

The half-time for crystallization of a material is defined throughout this specification and claims with reference to the classical Avrami equation $$-\ln x = Kt^n$$

where x is the fraction of uncrystallized material and is equal to

[1−(change in volume at time, t)/(change in volume at time, t=infinity)]

and where K and n are empirical coefficients found with respect to said material, to mean that time, $t_{\frac{1}{2}}$, found in the above equation when x=0.5.

A known technique for measuring a half-time is given by J. H. Magill in Polymer V. 2, page 221 (1961) in an article entitled "Depolarized Light Intensity Technique."

A differential in applied pressure is defined throughout the specification and claims to mean the difference in pressure between that lesser pressure on the side of the sheet to be thermoformed which is nearer to the mold surface and that greater pressure on the side of the sheet opposite thereto.

It is to be noted that the extrudate may be brought into contact with a chill roll so that no orientation or substantially no orientation is induced in the final sheet and there is a thermally induced average crystallinity in the finished sheet of less than about 10% and preferably less than about 5%. The amount of average crystallinity in the extruded sheet will depend upon how rapidly the extruded sheet is cooled, which in part depends upon the thickness of said sheet. If there is too much orientation in the sheet, heating before and during thermoforming will tend to induce substantial undesirable shrinkage. Such shrinkage can interfere with the thermoforming process.

In another embodiment of this invention, the process for thermoforming a foamed polyalkylene terephthalate resin sheet comprises:

(1) forming said sheet so that it is substantially unoriented, has a thermally induced average crystallinity in the range of about 0–10%, and has a half-time for crystallization at 410° F. below about 5 minutes and preferably below about 3 minutes and above about 0.5 minutes,
   (2) heating said sheet to an average temperature in the range of about 210°-300° F. and preferably in the range of about 225°-270° F. at such a rate (generally for example on the order of 10°-25° F./sec.) that by the time that said sheet has reached said temperature said sheet has an average crystallinity in the range of about 0% to 18%, and preferably about 5% to 15%.
   (3) thermoforming said sheet by:
      (a) contacting said sheet with a mold which is at a temperature in the range of about 240°-350° F. and preferably in the range of about 270°-310° F. wherein said mold is preferably at a higher temperature than said sheet prior to contact therebetween;

(b) applying forces comprising a differential in applied pressure to said sheet so as to make a thermoformed sheet which conforms to said mold;

(4) allowing said thermoformed sheet to remain in contact with said mold until an average crystallinity of at least 20% is achieved;

(5) removing said thermoformed sheet from said mold;

(6) allowing said thermoformed sheet to cool; and (7) trimming said thermoformed sheet.

It is to be noted that the step of trimming can precede the step of allowing the thermoformed sheet to cool to room temperature and the total cycle time requires about 30 seconds.

The maximum differential in applied pressure is determined by the tendency of the PAT sheet to be drawn into any vacuum passages present in a mold. Generally the greater the differential in applied pressure, the more the thermoformed sheet will conform to the surface of the mold and the better the definition of the finished thermoformed part. It is to be noted however that the PAT sheets made according to this invention can be thermoformed satisfactorily at a differential in applied pressure below 5 atmospheres and preferably as low as about one atmosphere.

Methods for producing a differential in applied pressure are well known. Use of differential in fluid pressure, such as with air, or a combination of reduced fluid or air pressure on one side with a solid cooperating surface on the other side are two known examples.

Any crystallization initiator can be used which in concentrations of up to about 1 part by weight to 100 parts by weight of PAT which forms a homogeneous blend with said PAT resin wherein there results a composition having a half-time for crystallization at 410° F. below about 5 minutes and preferably below about 3 minutes and above about 0.5 minutes. As is well known, the more surface to volume of a particular initiator, the more effective it is as an initiator of crystallization. Examples of such initiators are $TiO_2$, talc, MgO, $BaSO_4$, $SiO_2$, $Al_2O_3$, CdO, ZnO, mica fuller's earth, diatomaceous earth, and asbestos or the like. In general, initiators perform satisfactorily which have a median particle size in the range of about 1 to 5 microns wherein 95% of the particle have a size which is below about 10 microns and substantially all of the particles have a size which is below about 100 microns and which are present, in the composition of 100 parts by weight of PAT, in the range of 0.1–1 part, and preferably of about 0.2–0.6 part. Median particle size is defined throughout the specification and claims to mean a particle size in a distribution of particles wherein 50% of the particles are larger than said particle size. It is to be noted that too high a concentration by weight of a crystallization initiator, i.e. much above about 1 part can increase the half-time for crystallization and also can induce an annealed average crystallinity above 60% and that if the initiator particle size is too large undesirable discontinuities appear in the extruded PAT sheet commonly referred to in the art as "gel particles".

Polyethylene terephthalate resin having a crystallization initiator and having an inherent viscosity in the range of about 0.6–1 dl/g has been found to work satisfactorily.

It is to be noted that during the thermoforming process as a PAT sheet is being made to conform to a mold surface it must not become in some areas so oriented that the process of thermally induced crystallization in said areas is substantially inhibited.

In still another embodiment of this invention, a process is provided to permit thermoforming of PAT sheets to a draw ratio in excess of about 3 without introducing so much orientation that shrinkage and crystallization inhibition become problems.

In general, the process for deep-draw thermoforming a sheet of a foamed polyalkylene terephthalate resin which is substantially unoriented, has a half-time for crystallization at 410° F. below about 5 minutes, is at an average temperature in the range of about 210°–300° F., and preferably in the range of about 225°–270° F. and has an initial thermally induced average crystallinity in the range of about 0% to 18%, and preferably in the range of about 5% to 15%, comprises:

(a) contacting said sheet with a deep-draw mold which is at a temperature in the range of about 240°–350° F. and preferably in the range of about 270°–310° F. wherein said mold is preferably at a higher temperature than said sheet prior to contact therebetween;

(b) applying forces comprising a differential in applied pressure to said sheet so as to make said sheet conform to said mold, whereby a thermoformed sheet having a draw ratio in excess of about three can be achieved;

(c) allowing said thermoformed sheet to remain in contact with said mold until an average crystallinity of at least about 20% is achieved; and (d) removing said thermoformed sheet from said mold.

It is to be noted that if the shaped or thermoformed sheet does not have to withstand prolonged heating at 400° F., it can be removed from the mold before 20% thermally induced average crystallinity has been achieved.

EXAMPLE

A pellet mixture consisting of polyethylene terephthalate (Goodyear CLEARTUF 1002), 10 parts, and polycarbonate (Mobay Merlon M-39), 1 part, was extruded through a Brabender extruder to produce an amorphous sheet, 0.02 inches thick density=0.83 gms/cc. This material was heated to 80° C. and stretched 25 and 112%, cooled; upon reheating this original form was regained (shrink wrapping application). The material was also heated to 350° F., it was effectively heat-set and retained its shape upon subsequent heating to 350°–400° F. (Ovenable container application).

Extrusion consisted of a Brabender temperature profile of 265°, 315°, 335°, 275° C., resulting in a melt temperature at the die of 265°–285° C.; the molten material from the extruder die was immediately cooled on a chill roll (70°–120° F.) to prevent crystallization.

The foregoing Example demonstrates that foamed polyethylene terephthalate can be heated and shaped while maintaining its density and cells. By heat setting the foam (350° F. for 0.2–5 minutes) a product is produced which retains its shape upon subsequent reheating, and retains its flexibility and most of its toughness, the foam not collapsing during any heating nor the foam warping.

In addition to forming containers, the foamed, crystalline polyesters of the present invention may be used for other purposes. For example, foam could be used as high temperature insulation due to its good thermal stability up to 500° F.

The process of the present invention, whereby a preformed, polyester foam sheet is thermoformed, has the advantage that a portion of this foamed sheet material may be diverted from the thermoforming process to make shrinkable films or tapes for packaging applications.

It is noted that when forming foams in accordance with the present invention that polyester/polycarbonate blends should be maintained as dry as possible, e.g., prior to injection molding, to prevent moisture induced reductions in molecular weight. It is further noted that such polyester/polycarbonate blends may contain fillers, processing aids, nucleators to increase crystallization rate, and other additives known to the art which accomplish various technical effects.

What is claimed is:

1. A process for preparing a thermoformed, foamed, crystalline, high molecular weight linear polyester sheet, said process comprising the steps of:
   (i) reacting a homogeneous mixture consisting essentially of:
      (a) a high molecular weight linear polyester, which is a polycondensation product of an aromatic dicarboxylic acid and a glycol; and
      (b) a high molecular weight linear aromatic polycarbonate represented by the repeating structural unit of the formula:

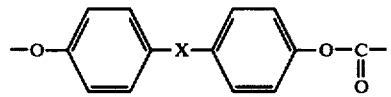

wherein X is a divalent hydrocarbon radical with a total of from 2 up to about 9 carbon atoms selected from the group consisting of

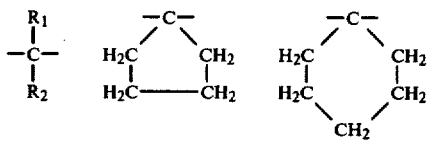

in which $R_1$ represents a member selected from the group consisting of hydrogen and lower alkyl and $R_2$ represents a member selected from the group consisting of phenyl and alkyl of 1 to 7 carbon atoms, in a weight ratio of (a):(b) of about 20:1 to 1:20, at a temperature and for a period of time sufficient to form the mixture into a softened foamable mass and to release carbon dioxide from said polycarbonate for foaming said mass;
   (ii) extruding said foamable mass of step (i) into a sheet at a pressure sufficient to cause the released carbon dioxide to expand and reduce the density of the extruded sheet;
   (iii) cooling said sheet of step (ii) on a chill roll at a temperature from about 70° F. to about 120° F. to inhibit crystallization whereby the average crystallinity of said sheet is in the range from about 0% to about 18%;
   (iv) contacting said sheet of step (iii) with a mold which is at a temperature in the range of from about 240°–350° F.;
   (v) applying forces comprising a differential in applied pressure to said sheet of step (iv) so as to make said sheet conform to said mold, whereby a thermoformed sheet is made;
   (vi) allowing said thermoformed sheet of step (v) to remain in contact with said mold until an average crystallinity of at least about 20% is achieved; and
   (vii) removing said thermoformed sheet of step (vi) from said mold.

2. A process according to claim 1, wherein said homogeneous mixture of step (i) is heated at a temperature of about 250° C. to about 350° C.

3. A process according to claim 1, wherein said differential in applied pressure in step (v) is in the range up to about 5 atmospheres.

4. A process according to claim 1, wherein said polyester is polyethylene terephthalate.

* * * * *